United States Patent [19]

Moore, III

[11] Patent Number: 4,989,913
[45] Date of Patent: Feb. 5, 1991

[54] BARRIER FOR USE IN HOLLOW CHANNEL IN MOTOR VEHICLE BODY AND METHOD FOR PRODUCING SAME

[75] Inventor: Dan T. Moore, III, Cleveland Heights, Ohio

[73] Assignee: Dan T. Moore Company, Cleveland, Ohio

[21] Appl. No.: 494,973
[22] Filed: Mar. 16, 1990
[51] Int. Cl.$^5$ .............................................. B62D 25/02
[52] U.S. Cl. ..................................... 296/205; 29/451; 138/89; 138/178
[58] Field of Search ............... 296/205, 208, 203, 204; 29/451; 138/99, 178, 89

[56] References Cited

U.S. PATENT DOCUMENTS

| | | | |
|---|---|---|---|
| 4,083,595 | 4/1978 | Maier | 296/39.3 |
| 4,271,238 | 6/1981 | Braithwaite | 296/205 |
| 4,741,945 | 5/1988 | Brant et al. | 296/39.3 |
| 4,826,238 | 5/1989 | Misono et al. | 296/205 |
| 4,863,771 | 9/1989 | Freeman | 296/205 |

Primary Examiner—Robert R. Song
Attorney, Agent, or Firm—Pearne, Gordon, McCoy & Granger

[57] ABSTRACT

A barrier to the passage of sound, vibration, and moisture through a hollow channel in a motor vehicle body and a method for producing same are provided. The barrier is comprised of a resilient body such as flexible foam and a heat-deformable member such as a tube which defines a passageway between the ends of the resilient body when the resilient body and the member are mounted in the hollow channel. The barrier may be coated with hot melt adhesive. The barrier is mounted in the hollow channel and the motor vehicle body is dipped in a paint bath and drained. Paint flows in and out through the passageway in the barrier, thus coating the interior of the hollow channel. When the motor vehicle body is passed through the bake oven, the heat-deformable member collapses, the barrier is closed, and the hot melt adhesive bonds the barrier to the channel.

30 Claims, 2 Drawing Sheets

BARRIER FOR USE IN HOLLOW CHANNEL IN MOTOR VEHICLE BODY AND METHOD FOR PRODUCING SAME

BACKGROUND OF THE INVENTION

This invention relates in general to barriers in motor vehicles, and more particularly to barriers to the passage of sound, vibration, and moisture through hollow channels in motor vehicles.

DESCRIPTION OF RELATED ART

Up to the present time, the motor vehicle industry has used (a) expandable baffle plates and (b) foam injection to seal off sound, vibration, and moisture from traveling through the hollow channels in a motor vehicle.

The expandable baffle plate consists of an expandable plastic which is fastened between two layers of sheet metal. The baffle has metal tabs, is inserted in the hollow channel, and is welded into place perpendicular to the long axis of the channel. There is clearance around the baffle to allow liquids to flow through the channel prior to the baffle's being sealed. This is necessary in order to allow solutions which wash oil and dirt off the motor vehicle body to drain and pass through the channel. It is also necessary because the motor vehicle body is immersed in paint and the paint must be able to drain into and then out from the channel. When the motor vehicle body passes through the paint bake oven, the temperature of the oven activates blowing agents in the expandable plastic that is constrained between the two sheet metal layers, causing it to expand and squeeze out between the two layers of metal. This effects a seal in the channel, creating the barrier to sound, vibration, and moisture.

In the foam injection technique an expandable foam in an uncured state is injected into the channel after the channel has been painted. The foam expands, sealing the channel, and then cures.

The expandable baffle plate has the following disadvantages.

(1) The baffle plates are hard to weld in place on high speed, automated welding lines. They are fragile and can easily be pushed out of position.

(2) The expandable plastic must expand uniformly. This has been a problem, since the bake ovens are generally set up for a variety of different temperatures and times.

(3) The metal baffle plates are complicated and expensive to make. They require two different stamping operations, generally done on progressive dies.

(4) The baffle plate parts are complicated to assemble. The three pieces must be installed in a fixture and stapled or welded together.

(5) It is easy to assemble the baffle plate into the motor vehicle body improperly. Typically, to allow fluids to flow out of the channel, it is necessary to have clearance of 3 mm around the perimeter of the baffle plate. However, if the baffle plate is pushed over to one side, this allows 6 mm on one side and often the plastic will expand in such a way that it will fall down into the channel and not effect the seal. If the part is cocked when it is installed, it can create a small ding or bump on the surface of the channel, which may have to be refinished.

The foam injection technique has the following disadvantages.

(1) Expensive machinery to inject the uncured foam is required.

(2) Special holes must be put in the channel to permit entry of the injection nozzle. The process of making the holes costs money and the holes later permit entry of moisture and dirt.

(3) The injectable foam is expensive and, since it is shot in blind, an excessive amount of foam tends to be utilized.

SUMMARY OF THE INVENTION

The present invention provides a novel barrier for use in a hollow channel in a motor vehicle body and a method for producing same. The present invention involves none of the disadvantages of the prior art, is inexpensive, and is lightweight, which are desirable characteristics in almost all components of motor vehicles.

The barrier of the present invention comprises a resilient body having at least one side and ends and a means defining a passageway between said ends when said barrier is mounted in a hollow channel in a motor vehicle body. At least a part of the passageway defining means is collapsible upon application of heat when said barrier is mounted in the hollow channel. When the passageway defining means collapses, the passageway is closed. The barrier may be coated with hot melt adhesive to bond the barrier to the channel and to seal its ends and sides. The ends of the resilient body are the exposed portions when it is mounted in the hollow channel, not the portions contacting the sides of the channel.

A method of manufacturing a motor vehicle body is also disclosed, utilizing a resilient body having ends and means by which a passageway can be defined between said ends, with at least part of said means being heat-deformable. The method comprises mounting the resilient body and the means inside a hollow channel in such a way that the means defines a passageway between said ends, said channel being defined by part of the unibody of the motor vehicle body. The unibody is dipped in liquid, such as paint or primer, at least to a level covering the resilient body and the means. The passageway permits liquid, such as paint or primer, to flow past the barrier into the next portion of the channel. The liquid is drained from the unibody, at least partly through the passageway. The unibody is then subjected to elevated temperatures, such as in a paint bake oven, wherein at least part of the heat-deformable part of the means collapses and the passageway is closed. As a result, a barrier to the passage of moisture and providing sound and vibration damping characteristics has been fixed in the hollow channel. The barrier may be coated with hot melt adhesive prior to placement in the channel. In this case, the elevated temperatures will bond the barrier to the channel.

These and other aspects of this invention are illustrated in the accompanying drawings and are more fully described in the following specification.

DESCRIPTION OF THE PREFERRED EMBODIMENT

Figure 1:
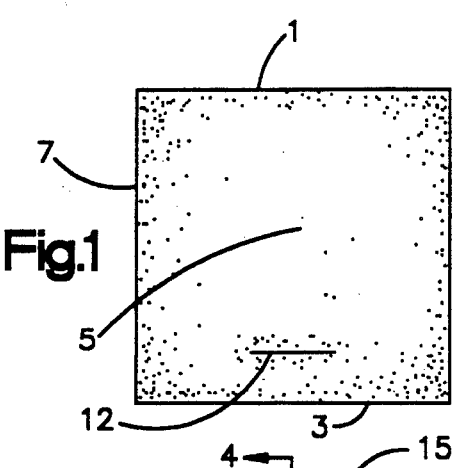
FIG. 1 is a front elevational view of a foam block including a slit for use in forming a barrier in accordance with the present invention.

With reference to FIG. 1, there is shown a foam block 11, typically one to four inches thick, and preferably about two to three inches thick. The block has side surfaces 1, 2, 3, and 7, a front end 5, and a back end 9 (see FIG. 4). The foam block illustrated in FIG. 1 is for use in a hollow channel of a motor vehicle body with a substantially square cross-sectional shape. A slit 12 has been cut through the foam block 11 from the front end 5 through to the back end 9, in from side 3.

Figure 2:
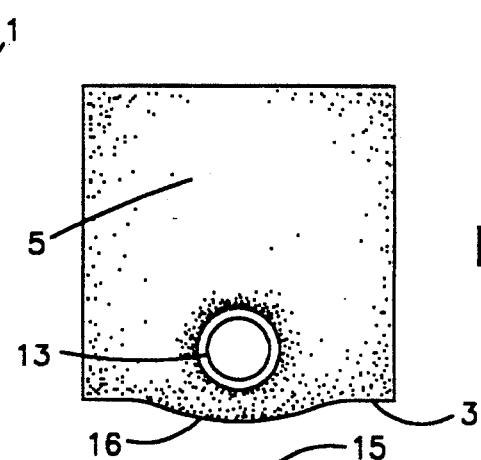
FIG. 2 is a front view similar to FIG. 1, showing the foam block having a tube inserted through the slit.

As shown in FIG. 2, a heat-deformable conduit or tube 13, approximately as long as the foam is thick, is inserted in the slit 12, causing the foam block 11 to bulge out at 16 in side 3. The resilience of the foam block holds the tube 13 in place, although adhesive or mechanical means could be used to help hold the tube 13 in place.

Figure 3:
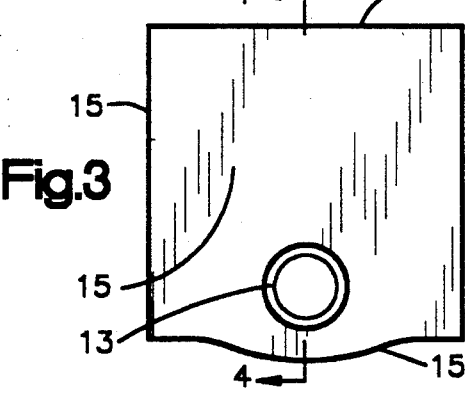
FIG. 3 is a front view similar to FIG. 2, showing the foam block after application of a coating, such as a coating of hot melt adhesive.
Figure 4:
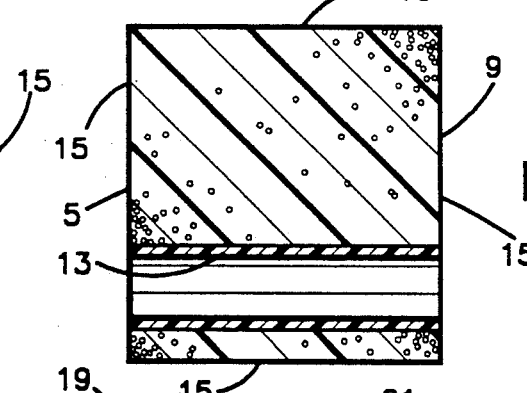
FIG. 4 is a sectional view taken along line 4—4 of FIG. 3.

The assembly is coated with a hot melt adhesive 15. FIG. 3 illustrates the assembly of FIG. 2 after the application of a coating 15 of hot melt adhesive. The coating 15 covers all outer surfaces of the foam block 11. FIG. 4 is a view of FIG. 3 in section.

Figure 5:
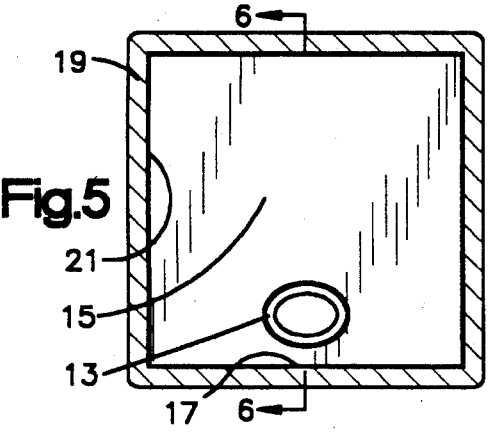
FIG. 5 is a front elevational view of the foam block of FIG. 3 mounted in a horizontal hollow channel, with the horizontal channel shown in section.
Figure 6:
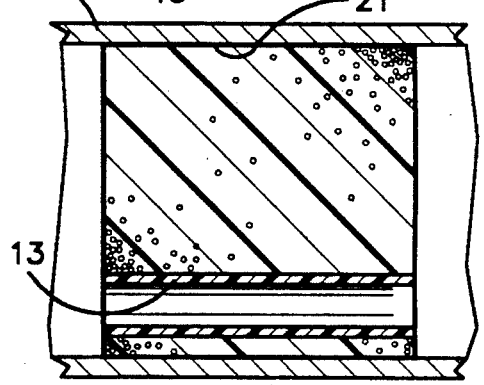
FIG. 6 is a sectional view taken along line 6—6 of FIG. 5.

FIG. 5 illustrates the barrier of FIG. 3 mounted in a hollow channel 19 of a motor vehicle body. The bulge at 16 is now flattened, as indicated at 17. The tube 13 of FIG. 3 is now a somewhat ovalized tube. The coating 15, shown in FIG. 3, contacts the inner surface of the channel 19, as indicated at 21. FIG. 6 is a view of FIG. 5 in section.

Figure 7:
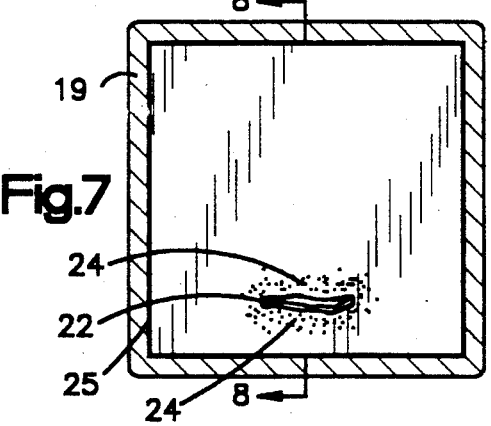
FIG. 7 is a front view similar to FIG. 5, showing the foam block after application of heat to form a barrier in the horizontal channel.
Figure 8:
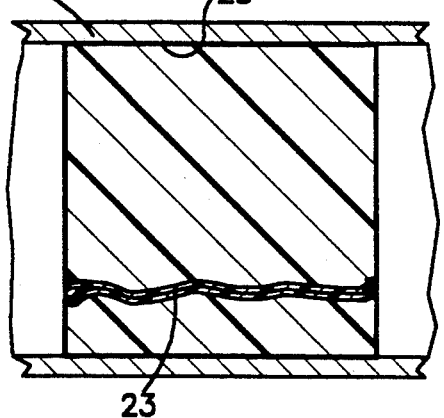
FIG. 8 is a sectional view taken along line 8—8 of FIG. 7.

FIG. 7 illustrates the barrier in the channel 19 after the motor vehicle body, of which the channel is a part, has gone through the bake ovens and the barrier has been closed. The tube 13 has melted or deformed to become a melted or deformed inclusion 22 and seal off the front end 5 and the back end 9 of the barrier. The coating 15 of hot melt adhesive has bonded the barrier to the channel, as indicated at 25. A small area of uncoated foam 24 may be present near where the slit was cut. The deformed tube 22 is shown in section at 23 in FIG. 8.

In the present invention, a resilient body can be made of any material which can be compressed and which will subsequently reform to near, or somewhat near, its original shape. A resilient body can be made of rubber, elastomers, a spring in combination with other materials, or the like, but is preferably flexible foam. The resilient body must be able to substantially withstand the heat to which it is subjected in the bake ovens, that being up to approximately 450° F. for up to one hour, without materially decomposing or materially losing resilience. The barrier to be sealed in the channel should have sound and vibration damping characteristics, and should also be capable of acting as a barrier to the passage of moisture.

In the preferred embodiment, a block of open-cell flexible foam 11, such as UNIFOAM S82N, a relatively firm, flexible polyester urethane open-cell foam available from Wm. T. Burnett & Co., Inc., 1500 Bush Street, Baltimore, Md. 21230, approximately one to four, and preferably two to three, inches thick, is used. It is die-cut generally to the interior configuration of the hollow channel 19 which it is to seal, but is cut slightly larger, approximately one-eighth to one-half inch, and preferably one-quarter inch, all the way around, so that the foam block, when it is inserted or mounted in the hollow channel, will become slightly squashed and will fit snugly and securely in the channel, and during the cleaning and painting operations will not be jostled or pushed out of position. Thus, the cross section of the foam block 11 corresponds generally to, but is slightly larger than, the cross section of the hollow channel 19. The hollow channel 19 of the motor vehicle body may be round, triangular, trapezoidal, or any other shape, in cross-sectional appearance. Other flexible foams which can be used, also available from Wm. T. Burnett & Co., are UNIFOAM S82R, a relatively firm, flexible polyester urethane open-cell foam, and UNIFOAM S82C, a flexible polyester urethane open-cell foam.

The lateral dimensions of the foam block may be reduced, but not below the interior size of the channel to be sealed, if other attachment means are utilized, such as projections from the channel, or glue or other mechanical or adhesive means.

UNIFOAM S82N, referenced above, has the following physical properties: weight of 2 lbs. ±10% per cubic foot; tensile strength of 17–25 psi; ultimate elongation of 125–175%; tear resistance of 1.4–2.2 ppi; compression set (original height; 22 hours @ 50% compression @ 70° C.) of max. 10%; compression load deflection @ 25% deflection of 0.60–0.85 psi; cell count (visual) of 50–60 pores per linear inch: retention of 70% tensile strength after 6 hours steam autoclave @ 105° C.; retention of 80% tensile strength after 24 hours dry heat aging @ 140° C.; it passes the flammability classification of UL 94 HF-1. Test methods were ASTM-D-1564. Acoustic data included an average normal-incidence sound absorption coefficient of 0.80 for one inch at 1600 cps. and average random-incidence (calculated) sound absorption coefficient of 0.97 for one inch at 1600 cps.

Preferably a slit 12 is made through the foam block 11 less than approximately one inch, and preferably less than one-half inch, in from the side 3 and parallel thereto, and longitudinally to the channel in which the barrier is to be placed. Alternatively, intersecting slits may be made in the foam or other means to frictionally hold the tube 13 in place. Through the slit 12 is inserted a heat-deformable tube 13 which is held in place by friction or, alternatively, by adhesive means. The resilience of the foam acts compressively on the tube and will help close the passageway defined by the tube when the tube deforms upon application of heat. The tube and foam block should be selected in such a way that as the tube deforms or melts, the foam block reforms to close the passageway defined by the tube. The tube and foam block should be selected in such a way as to avoid a situation wherein the foam block does not reform sufficiently to close the passageway as the tube deforms or melts. To be avoided is a situation where the foam reforms insufficiently and the tube melts (possibly running out of the passageway) and an open passageway through the foam block is left. Preferably, the heat-deformable tube 13 is a tube about one-quarter to one and one-half inches in inner diameter, which is made of plastic which will melt or deform and collapse during the paint bake cycle for the motor vehicle body. The plastic is selected so that it melts and/or deforms at the temperature the paint bake ovens get to. The purpose of the tube is to permit liquids to flow into and out of the channel during operations to clean and paint the motor vehicle body The tube then deforms and closes during the paint bake cycle, sealing the barrier. It is preferable to close the entire length of the tube, not just a portion thereof More than one tube may be used in the barrier A tube made of ethylene vinyl acetate copolymer, with 9% vinyl acetate, available from C-I-L Inc., P.O. Box 200, North York, Ontario, CANADA M2N 6H2, as product #1080, which product has a melt index of 1 according to ASTM D-1238, has been found utilizable.

Also utilizable are tubes made of other ethylene vinyl acetate copolymers, available from C-I-L Inc. as products #1210 and #1220, with 12% and 15% vinyl acetate, respectively. Both #1210 and #1220 also have a melt index of 1 according to ASTM D-1238. The melt index of the plastic used to make the tube will vary according to the oven temperature and time in the oven. It is believed that tubes made of plastic with a melt index ranging from approximately 0.5 to approximately 2 should be able to accommodate most paint bake cycles anticipated. The precise type of ethylene vinyl acetate copolymer or other plastic used will vary to achieve the proper melt characteristics.

Figure 10:
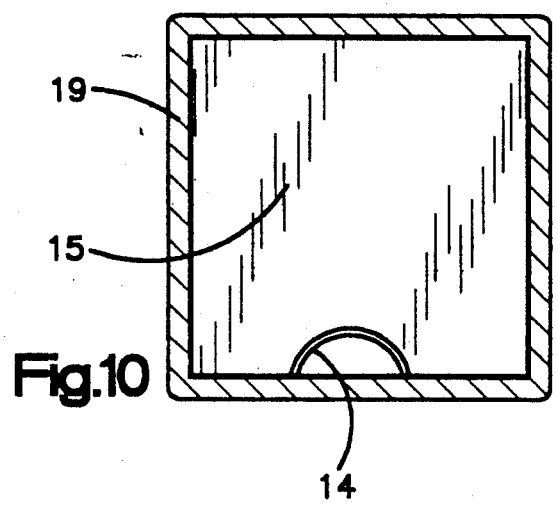
FIG. 10 is a front elevational view of the foam block of FIG. 9, coated and mounted in a horizontal hollow channel, with the horizontal channel shown in section.

Since the motor vehicle body will be submerged in liquids during the cleaning and painting operations, and then removed from said liquids to permit drainage thereof, the heat-deformable tube is placed in or on the foam in such a way that when the motor vehicle body is raised from the liquid and drainage undertaken, the tube will be so positioned in the channel as to permit the maximum amount of liquid to drain out of the channel. Depending on the angle at which the motor vehicle body is removed from the liquid, the tube (or tubes, if necessary) will be generally placed at the lowest point of the barrier, as illustrated in FIG. 10, or as near thereto as is practical without causing the foam to tear, as illustrated in FIG. 5. The arrangement of FIG. 5 will cause some liquid to collect between the inner edge of the tube 13 and the outer edge of the foam at 17, but this is minimized by placing the tube as close to the edge of the foam as possible without tearing the foam.

Alternatively, the topmost face of the foam (when viewed from the perspective of the motor vehicle body being drained after being submerged in liquid) can be funnel-shaped, with the tube at the bottom of the funnel, to permit efficient drainage.

The tube need not be as long as the slit is deep, but it is preferable to have the tube extend to the end walls of the foam block, as illustrated in FIG. 4, or to within about one-quarter inch of the end walls.

A coating 15 is applied to the exterior surface of the foam block before or after insertion of the heat-deformable tube. The purpose is, in part, to seal the open cells in the foam and make the barrier completely, essentially, or substantially impermeable to liquids used in the subsequent cleaning and painting operations. If the resilient body is alternatively made of a flexible closed-cell foam, such as polyvinyl chloride, then a coating would not be needed to seal its exposed surfaces. Preferably, the coating is a hot melt adhesive, such as Airflex #320, a water-based polyvinyl acetate emulsion, available from Air Products and Chemicals, Inc., 7201 Hamilton Boulevard, Allentown, Pa. 18195-1501. The Airflex #320 is sprayed on, after which the barrier is placed for approximately five to ten minutes in an oven at a temperature of less than 250° F. to dry the adhesive. The spraying and drying steps may have to be repeated to create a sufficient coating. As presently practiced, two spraying and drying steps are sufficient. The composition of the coating 15 and tube 13 and the drying time and temperature of the coating may have to be adjusted so that the drying of the coating does not melt the tube, while the bake ovens do melt the tube.

After drying, the hot melt adhesive should be dry to the touch, to permit ease of handling and shipping. The hot melt adhesive, after drying, must be sufficiently fire-resistant to withstand weld spatter generated as the motor vehicle body is welded together.

The hot melt adhesive also serves to bond the barrier to the channel when the motor vehicle body is passed through the bake ovens. Thus, the hot melt adhesive can serve as both the attachment means and the coating which seals the open cells of the foam block.

Test data show that UNIFOAM S82N, when sufficiently coated with coating, will increase in weight less than 10% when fully immersed in water for five minutes.

The foam block with tube, and coated, is placed inside the hollow channel before during, or after the manufacture of the channel. Multiple barriers may be inserted in a single channel. In order to more firmly fix a barrier in a channel prior to passage through a bake oven, adhesive or mechanical means may be employed, including pressure-sensitive adhesive or the addition of a weld point, which is a metal piece integral with the foam which can be welded to the channel in the motor vehicle body.

The next step, typically, is to dip and submerge the motor vehicle unibody in a phosphate wash, to clean the metal prior to priming and painting. This phosphate wash liquid flows through the tube in the barrier, thus gaining access through the length of the channel. The motor vehicle unibody is then lifted from the liquid and the liquid is drained from the unibody, with the liquid flowing back out through the tube in the barrier. As discussed above, the tube is positioned in the barrier so as to permit the maximum amount of liquid to drain out of the channel.

The motor vehicle unibody is then, typically, dipped in a water rinse, drained, and dipped in an electrodeposition primer paint and drained, as described above. The foam block, tube, coating, and any adhesive used in connection with the barrier must be such as not to contaminate the electrodeposition primer paint in which they are submerged.

The motor vehicle unibody is then passed through a bake oven to dry the electrodeposition primer paint. The time and temperature in the bake oven are dependent on a number of variables, but typically will be between 15 and 60 minutes and between 200° F. and 450° F., with a typical temperature range being 325°–400° F. for 30 minutes. Typically, a primer is then sprayed onto the motor vehicle unibody and the unibody is passed again through a bake oven at approximately 275°–325° F. Typically, various enamel or lacquer top coats with color are sprayed and baked on at temperatures typically 200°–270° F. for enamel and 225°–400° F. for lacquer. The plastic composition of the tube in the foam block is selected so that the tube will collapse and close during the passage through the various bake ovens utilized in the painting operations.

As used herein, a hollow channel includes a pillar, a column, a hollow beam, a rocker panel, and any hollow enclosed space or passageway in a motor vehicle.

If a spring were used as the resilient body, it would be arranged in such a way that it would act compressively on the heat-deformable tube, and would act to close the passageway when the tube deformed upon application of heat.

Figure 9:
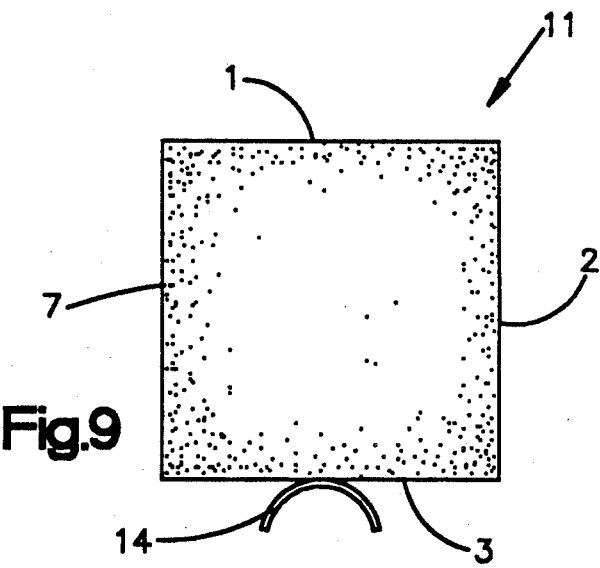
FIG. 9 is a front elevational view of a foam block with a trough-shaped conduit attached thereto.

FIG. 9 illustrates an alternative embodiment of the present invention, whereby a heat-deformable trough-shaped conduit 14 is adhesively or mechanically attached to the side 3 of foam block 11. Trough-shaped conduit 14 may also be held on with a strap (not shown). In this illustration, trough-shaped conduit 14 defines a passageway between the ends of the foam block 11. FIG. 10 illustrates the barrier of FIG. 9 coated with coating 15 and mounted in a hollow channel 19. Alternatively, the heat-deformable trough-shaped conduit 14 and the foam block 11 may be separately assembled inside the channel 19, to form the arrangement illustrated in FIG. 10. The components of the barrier, i.e., the foam block and conduit, need not be attached to each other prior to being mounted in the channel. They may be separately assembled or separately mounted in the channel.

An advantage of the embodiment of FIGS. 9 and 10 is that the passageway defined by the trough-shaped conduit 14 abuts the bottom inside surface of the channel 19. With this arrangement, the passageway can be placed at the lowest point in the barrier and efficient drainage can be obtained without liquid collecting on a lip.

Although the preferred embodiment of this invention has been shown and described, it should be understood that various modifications, replacements, and rearrangements of the parts and methods may be resorted to without departing from the scope of the invention as disclosed and claimed herein.

What is claimed is:

1. A barrier for use in a hollow channel in a motor vehicle body, said barrier comprising:
    (a) a resilient body having at least one side and ends; and
    (b) means defining a passageway between said ends when said barrier is mounted in said hollow channel;
with at least part of said passageway defining means being collapsible upon application of heat when said barrier is mounted in said hollow channel, so as to close said passageway.

2. A barrier according to claim 1, wherein said resilient body is a body of flexible foam.

3. A barrier according to claim 1, wherein said resilient body is a body of flexible polyester urethane foam.

4. A barrier according to claim 1, wherein said passageway defining means is a tube of ethylene vinyl acetate copolymer through said resilient body.

5. A barrier according to claim 1, further comprising attachment means, wherein said attachment means are utilizable to fix said barrier in place in said hollow channel.

6. A barrier according to claim 5, wherein said attachment means comprises a hot melt adhesive, said hot melt adhesive covering at least a portion of the portion of the barrier which will be in contact with said hollow channel.

7. A barrier according to claim 1 with said barrier having an exposed surface, further comprising a coating covering substantially all of said exposed surface of said barrier which can be penetrated by liquids used in motor vehicle body painting operations, and with said coating being essentially impenetrable by said liquids.

8. A barrier according to claim 7, wherein said coating is a hot melt adhesive.

9. A barrier according to claim 8, wherein said hot melt adhesive is fire-resistant.

10. A barrier according to claim 1, further comprising a hot melt adhesive, wherein said hot melt adhesive covers substantially all of the exposed surface of said barrier which can be penetrated by liquids used in motor vehicle body painting operations, and said hot melt adhesive being essentially impenetrable by said liquids, and wherein said hot melt adhesive covers at least a portion of the portion of the barrier which will be in contact with said hollow channel.

11. A barrier according to claim 1, wherein said passageway defining means is near to one side of said barrier.

12. A method of providing a barrier/for use in a hollow channel in a motor vehicle body, said method utilizing a resilient body having ends and means defining a passageway between said ends when said barrier is mounted in said hollow channel, at least part of said passageway defining means being heat-deformable, said method comprising the step of fixing said passageway defining means in contact with said resilient body so that upon placement of said barrier in said hollow channel and upon application of heat, the passageway defined by said passageway defining means will be closed.

13. A method according to claim 12, wherein said step of fixing said passageway defining means in contact with said resilient body comprises the steps of:
    (a) cutting a slit in said resilient body; and
    (b) inserting a heat-deformable conduit into said slit so that said heat-deformable conduit is in compressive contact with said resilient body.

14. A method according to claim 12, wherein said passageway defining means is a tube collapsible upon the application of heat.

15. A method according to claim 12, wherein said resilient body is a body of flexible foam.

16. A method according to claim 12, further comprising a next step of covering at least a portion of the exposed surface of said barrier with hot melt adhesive.

17. A method according to claim 13, further comprising a next step of covering with hot melt adhesive substantially all of that portion of the exposed surface of said barrier which can be penetrated by liquids used in motor vehicle body painting operations.

18. A motor vehicle body comprising a unibody, wherein part of said unibody defines a hollow channel, a barrier within said channel, said barrier including a resilient body having ends, and means defining a passageway between said ends, with at least part of said passageway defining means being heat-deformable, said passageway permitting flow of a coating past said barrier to coat the interior of said hollow channel, said passageway being closable upon application of heat.

19. A motor vehicle body comprising a unibody, part of said unibody defining a hollow channel, a barrier being mounted within said channel, said barrier having ends, wherein prior to heating, passage means define a passageway between said ends, at least a portion of said passage means being heat-deformable, said passageway being closed, said closure being caused by the collapse of at least a portion of said heat-deformable portion upon the application of heat.

20. A motor vehicle body according to claim 18, wherein said resilient body is a body of flexible foam.

21. A motor vehicle body according to claim 19, wherein at least a substantial portion of said barrier is foam.

22. A motor vehicle body according to claim 19, wherein said closed passageway is near one side of said barrier.

23. A motor vehicle body according to claim 19, wherein said barrier is fixed inside said hollow channel by hot melt adhesive.

24. A motor vehicle body according to claim 18, wherein said passageway defining means is a tube.

25. A motor vehicle body according to claim 18, wherein said barrier is at least partially coated with hot melt adhesive.

26. A method of manufacturing a motor vehicle body utilizing a resilient body having ends and means by which a passageway can be defined between said ends, at least part of said means being heat-deformable, said method comprising the steps of:

(a) mounting said resilient body and said means inside a hollow channel in such a way that said means defines a passageway between said ends, said channel being defined by part of the unibody of said motor vehicle body, said passageway being closable upon application of heat when said resilient body and said means are so mounted;
(b) submerging said unibody in liquid at least to a level covering said resilient body and said means;
(c) draining said liquid from said unibody at least partly through said passageway; and
(d) subjecting said unibody to elevated temperatures, wherein at least a portion of the heat-deformable part of said means collapses and said passageway is closed.

27. A method according to claim 26, wherein said resilient body is flexible foam.

28. A method according to claim 26, wherein said means is a tube.

29. A method according to claim 26, wherein said resilient body, prior to being mounted in said hollow channel, is at least partly coated with hot melt adhesive.

30. A barrier for use in a hollow channel in a motor vehicle body, said barrier comprising:

(a) a block of flexible open-cell polyester urethane foam; and
(b) a heat-deformable tube of ethylene vinyl acetate copolymer;

wherein a slit has been cut in said foam block, said heat-deformable tube has been inserted into said slit, and a hot melt adhesive coating has been applied to the exterior surface of said foam block.

* * * * *